March 12, 1940.  G. B. WINSOR ET AL  2,192,877
DISK HARROW
Filed April 11, 1939   2 Sheets-Sheet 1
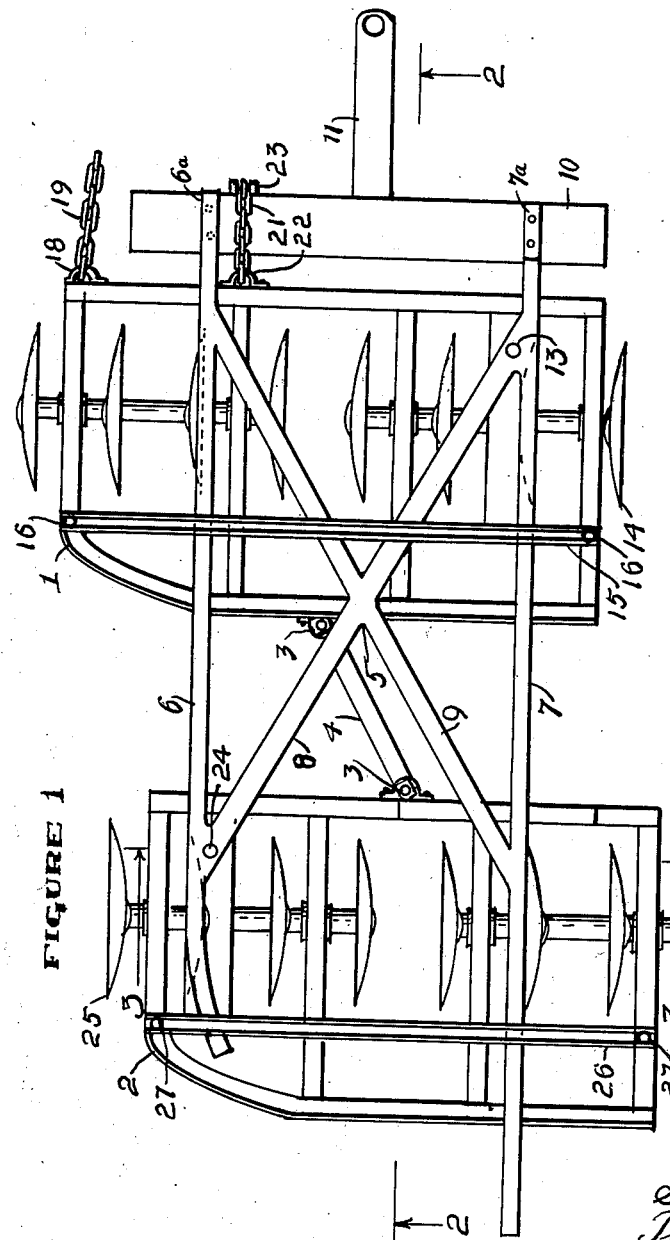
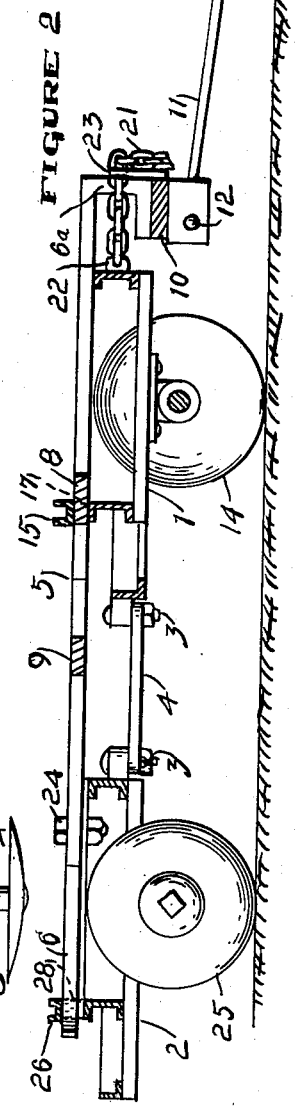
INVENTOR
George B. Winsor
Thomas B. Winsor
John A. Naismith
ATTORNEY March 12, 1940. G. B. WINSOR ET AL 2,192,877
DISK HARROW
Filed April 11, 1939 2 Sheets-Sheet 2

INVENTOR
George B. Winsor
Thomas B. Winsor
John A. Naismith
ATTORNEY

Patented Mar. 12, 1940

2,192,877

UNITED STATES PATENT OFFICE 2,192,877

DISK HARROW

George B. Winsor and Thomas B. Winsor, Milpitas, Calif.

Application April 11, 1939, Serial No. 267,222

4 Claims. (Cl. 55—83)

In the operation of earth-working tools of the disk harrow type a number of difficulties are encountered. Chief among these difficulties are, maintaining the disks at a uniform depth in the soil regardless of varying density of the soil in spots, and maintaining the disks at a uniform depth in the soil during a turning operation.

With respect to the first difficulty mentioned, it is well known that when working over a field a harrow will encounter hard and soft areas in the soil at the same time; probably a dense heavy clay area adjoining an area rendered loose and light by heavy mulching. In all such cases the disks encountering the hard areas will travel over the same, thereby not only failing to loosen the said harder areas, but also lifting adjoint disk of the gang so that they will not cut to the desired depth.

With respect to the second difficulty mentioned, it is also well known that in turning a disk harrow while at work in the field the forward inner corner of the assembly tends to dig deeper into the soil, and the diametrically opposite corner tends to rise out of the soil, thus materially reducing the efficiency of the machine, particularly when making a right-hand turn. The reason for this, of course, is because the front gang of disks are dished on the side directed toward the turn, while the rear gang of disks are dished on the side facing the opposite direction.

It is, therefore, the object of the present invention to overcome the difficulties above indicated, and to provide a machine of the character indicated constructed and arranged to constantly maintain all of the disks on a substantially uniform horizontal plane, or a plane parallel with the surface of the ground over which the machine is moved, regardless of the character of the soil through which the disks are moved, and regardless of the direction in which the machine is turned.

It is also an object of the invention to provide a tool of the character indicated that will be economical to manufacture, simple in form and construction, and that will be strong and durable, and highly efficient in its practical application.

In the drawing:

Figure 1 is a top plan view of a machine embodying our invention.

Figure 2 is sectional view on line 2—2 of Figure 1.

Figure 5:
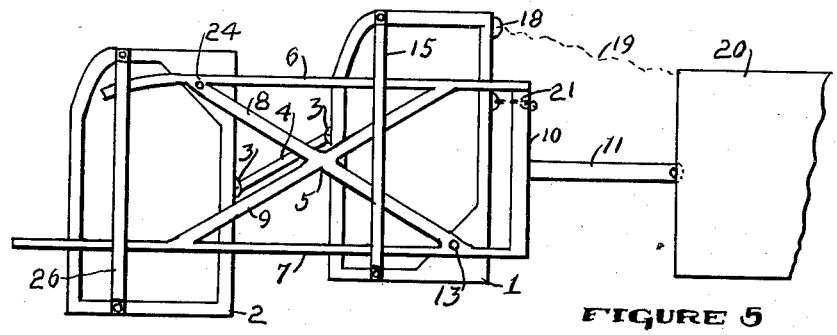
Figure 5 is a diagrammatical illustration showing the two gangs of disks in another adjusted position relative to a tractor connected thereto.

In the particular embodiment of the invention as herein disclosed, we show at 1 and 2 the two gang frames pivotally connected as at 3 by a link 4.

At 5 is shown a draft frame comprising two parallel side members 6 and 7 rigidly supported and spaced by cross members 8 and 9, the whole frame being integrally formed and disposed upon and overlying the gang frames 1 and 2 to lie in a plane paralleling the plane of the ground over which the tool is working.

The two side members 6 and 7 are formed as at 6a and 7a at one end to engage and carry a transverse bar 10 to which they are rigidly connected, and to the center of the bar 10 is connected the draw-bar 11 pivoted to swing in a plane vertical to the bar 10 as at 12.

The front gang frame 1 is offset to the left relative to the longitudinal center line of the draft frame, and is pivotally connected thereto for adjustment about a vertical axis as at 13. The frame 1 carries the conventional assembly of axle and disks as indicated generally at 14, and the pivotal connection 13 is located on the frame 1 at a point forwardly of the assembly 14 adjacent the forward and right-hand edges of the frame. This brings the pivotal connection adjacent the right-hand end of the disk assembly in which the dished sides of the disks are directed to the right.

Extending lengthwise of the gang frame 1 rearwardly of the disk assembly in parallel relation thereto and overlying the draft frame 5 is a bar 15, this bar being rigidly mounted on the ends of the gang frame as at 16, spacers as 17 being inserted between the bar and the frame so that the draft frame 5 will slide easily therebetween.

Attached to the left forward corner of gang frame 1 as at 18 is a chain 19 by means of which connection is made to the left rear corner of a tractor 20. At 21 is shown another chain connected to the frame 1 on its forward edge and spaced back from its left-hand edge as at 22, this chain being adjustably connected to a fork 23 on the forward edge of bar 10. By the adjustment of this chain the frame 1 may be allowed to assume any desired angle relative to the bar 10 and the draft line of the tool.

The rear gang frame 2 is offset to the right relative to the longitudinal center line of the draft frame and is pivotally connected thereto for adjustment about a vertical axis 24. The frame 2 carries the conventional assembly of axle and disks as indicated at 25, and the pivotal connection 24 is located on the frame 2 at a point forwardly of the assembly 25 adjacent the forward and left-hand edges of the frame 2. This brings the pivotal connection adjacent the left-hand end of the disk assembly in which the dished sides of the disks are directed to the left.

Extending lengthwise of the gang frame 2 rearwardly of the disk assembly, in parallel relation thereto and overlying the draft frame 5 is a bar 26, this bar being rigidly mounted on the ends of the gang frame at 27 and spaced therefrom as at 28 to permit the draft frame 5 to slide easily therebetween.

The pivotal points 13 and 24 are located on diametrically opposite ends of the draft frame 5 adjacent the side members 6 and 7, respectively, at opposite ends of the cross member 8.

By mounting the frames 1 and 2 as above described with the link 4 connecting the centers of their opposing edges it follows that any adjustment of the frame 1 about its pivotal point 13 results in a similar adjustment of frame 2 about its pivotal point at 24.

Figure 4:
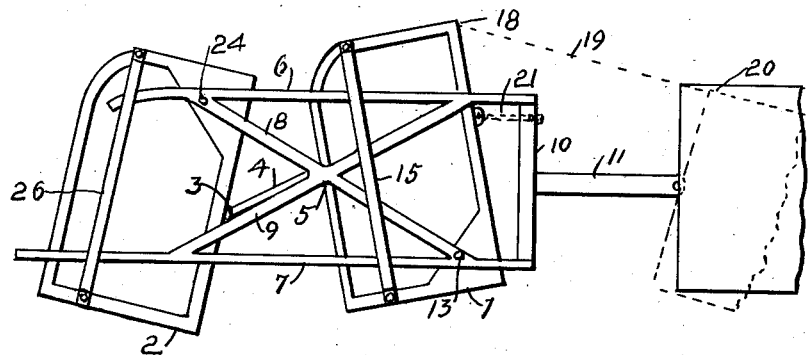
Figure 4 is a diagrammatical illustration showing the two gangs of disks in an adjusted position.
Figure 3:
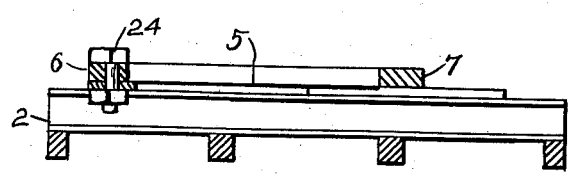
Figure 3 is a section on line 3—3 of Figure 1.

When in operation and moving in a straight line the draft is applied to the gang frames through the medium of chain 21, the chain 19 being inoperative as indicated in Figure 5. But when negotiating a turn as indicated in Figure 4, then the chain 21 is rendered inoperative and the draft is applied through the medium of chain 19.

The utility and advantage of the draft frame as combined with the gang frames will now be apparent. Since the draft frame is a rigid structure and is held flat upon the tops of the frames 1 and 2 by the bars 15 and 23, it follows that no portion of the tool has independent vertical action, and tendency of one portion of the tool to rise being controlled by the tool in its entirety. The structure described is such that the two gang frames may be adjusted as desired and freely pulled around on a turn, yet they are positively held in a single plane in fixed parallel relation to the draft plane.

Although a certain specific embodiment of the invention has been illustrated and described, it will be understood that various alterations in the details of construction and mode of assembly may be made without departing from the scope of the invention as indicated in the appended claims.

We claim:

1. In combination, a gang frame, a draft frame overlying the same and pivotally connected thereto on one side of its longitudinal center line and at a point adjacent one forward end portion of the gang frame, a draw-bar pivotally connected to the draft frame on a horizontal axis, a flexible member connected to the gang frame adjacent the end remote from its pivotal point and adjustably attached to the forward end of the draft frame to establish a pulling connection therebetween, and a flexible member attached to the extreme end of the gang frame remote from its pivotal connection to effect a draft connection to a tractor.

2. In combination, a gang frame, a draft frame overlying the same and pivotally connected thereto on one side of its longitudinal center line and at a point adjacent one forward end portion of the gang frame, a tractor, a draw-bar pivotally connected to the draft frame on a horizontal axis and to the tractor, a flexible member connected to the gang frame adjacent the end remote from its pivotal point and adjustably attached to the forward end of the draft frame to establish a pulling connection between the two, and a flexible member attached to the extreme end of the gang frame remote from its pivotal connection and to the adjacent corner of the tractor to effect a draft connection therewith.

3. In combination, a gang frame, a draft frame overlying the same and pivotally connected thereto on one side of its longitudinal axis and at a point adjacent one forward corner of the gang frame, a flexible member adjustably connecting the gang at its other forward corner to the forward end of the draft frame to establish a pulling connection therebetween, and a bar mounted on the ends of the gang and overlying the draft frame to form a guide to maintain the draft frame in parallel relation with the gang frame.

4. In combination, a pair of offset disk gang frames, a draft frame overlying the gang frames in parallel relation thereto, the gang frames being pivotally connected at their opposite forward corners to points on the draft frame located on opposite sides of the longitudinal center thereof, a link pivotally connected to one gang on the side of said center line opposite to the pivotal connection between the frame and gang and to the other gang on the other side of said center line, each gang having a bar mounted thereon in parallel relation thereto and extending from end to end thereof to overlie the draft frame and maintain the gang frames and draft frame in parallel relation with each other.

GEORGE B. WINSOR.
THOMAS B. WINSOR.